United States Patent
Teranishi et al.

(10) Patent No.: US 10,138,532 B2
(45) Date of Patent: Nov. 27, 2018

(54) NONFERROUS METAL MELTING FURNACE AND METHOD FOR MELTING NONFERROUS METAL

(71) Applicants: SANKEN SANGYO CO., LTD., Hiroshima-shi, Hiroshima (JP); CENTRAL MOTOR WHEEL CO., LTD., Anjo-shi, Aichi (JP)

(72) Inventors: Matoshi Teranishi, Hatsukaichi (JP); Ken Fujita, Hiroshima (JP); Nahoko Hanaoka, Hiroshima (JP); Hirotoshi Yabumoto, Hiroshima (JP); Fumito Inuzuka, Nishio (JP)

(73) Assignees: SANKEN SANGYO CO., LTD., Hiroshima (JP); CENTRAL MOTOR WHEEL CO., LTD., Aichi (JP)

( * ) Notice: Subject to any disclaimer, the term of this patent is extended or adjusted under 35 U.S.C. 154(b) by 238 days.

(21) Appl. No.: 15/084,551

(22) Filed: Mar. 30, 2016

(65) Prior Publication Data
US 2017/0130298 A1 May 11, 2017

Related U.S. Application Data

(63) Continuation of application No. PCT/JP2014/076411, filed on Oct. 2, 2014.

(30) Foreign Application Priority Data

Oct. 4, 2013 (JP) .................................. 2013-208782

(51) Int. Cl.
*C22B 21/00* (2006.01)
*F27D 3/00* (2006.01)
(Continued)

(52) U.S. Cl.
CPC .......... *C22B 21/0084* (2013.01); *C22B 7/003* (2013.01); *C22B 21/0092* (2013.01);
(Continued)

(58) Field of Classification Search
CPC . C22B 21/0084; C22B 21/0092; C22B 7/003; F27D 27/00; F27D 27/005;
(Continued)

(56) References Cited

U.S. PATENT DOCUMENTS

| 7,662,335 B2* | 2/2010 | Vild ................... C22B 21/0069 266/216 |
| 7,858,022 B2* | 12/2010 | Okada ................. F27B 14/0806 266/242 |
| 8,703,043 B2* | 4/2014 | Takahashi ............... F27B 19/04 222/594 |

FOREIGN PATENT DOCUMENTS

| CN | 101194139 A | 6/2008 |
| JP | H06-207230 A | 7/1994 |

(Continued)

OTHER PUBLICATIONS

JPH 06207230—English machine traslation version, Shoji et al, Apparatus for melting aluminum chip, Jul. 26, 1994, 8pages.*
(Continued)

*Primary Examiner* — Scott R Kastler
*Assistant Examiner* — Michael Aboagye
(74) *Attorney, Agent, or Firm* — Robert P. Michal, Esq.; Carter, DeLuca, Farrell & Schmidt, LLP

(57) ABSTRACT

A vortex chamber includes an outer circumference wall, a container, an annular shoal portion provided between the container and the outer circumference wall so as to encircle the outer circumference of the container, and a dam portion protruding upward from the upper surface of the outer circumference of the container so as to partition the con-
(Continued)

tainer from the shoal portion. An undried nonferrous metal block is fed into the shoal portion, the block having such a size that is not completely submerged into the molten metal in the shoal portion. The fed nonferrous metal block is gradually melted to have a reduced volume of small pieces and particles of nonferrous metal, which are re-circulated in the shoal portion, flown over the dam portion, and dropped into the container, thereby forming a vortex in the container in which remaining small pieces and particles submerged into the molten metal are melted.

9 Claims, 5 Drawing Sheets

(51) Int. Cl.
*C22B 7/00* (2006.01)
*F27B 3/04* (2006.01)
*F27D 27/00* (2010.01)
*F27D 3/14* (2006.01)
*F27D 99/00* (2010.01)

(52) U.S. Cl.
CPC ............ *F27B 3/045* (2013.01); *F27D 3/0025* (2013.01); *F27D 3/14* (2013.01); *F27D 27/00* (2013.01); *F27D 27/005* (2013.01); *F27D 99/007* (2013.01); *F27D 99/0033* (2013.01); *Y02P 10/218* (2015.11)

(58) Field of Classification Search
CPC ...... F27D 3/0025; F27D 3/14; F27D 99/0033; F27D 99/007; F27B 3/045
USPC ......... 266/44, 216, 217, 233, 235, 236, 901, 266/900, 234; 75/583, 686, 687; 222/590, 694, 606
See application file for complete search history.

(56) References Cited

FOREIGN PATENT DOCUMENTS

| | | | | |
|---|---|---|---|---|
| JP | H 06207230 | * | 7/1994 | ......... C22B 21/0084 |
| JP | 2554510 B2 | | 11/1996 | |
| JP | 2002-155322 A | | 5/2002 | |
| JP | 2004-131784 A | | 4/2004 | |
| JP | 2004-149815 A | | 5/2004 | |
| JP | 2004-238650 A | | 8/2004 | |
| WO | WO-2005/054521 A1 | | 6/2005 | |

OTHER PUBLICATIONS

Office Action issued by the State Intellectual Property Office of the People's Republic of China in relation to Chinese Patent Application No. 201480053906.8 dated Dec. 26, 2016 (5 pages).
Search Report issued by the State Intellectual Property Office of the People's Republic of China in relation to Chinese Patent Application No. 201480053906.8 dated Dec. 16, 2016 (2 pages).

* cited by examiner

NONFERROUS METAL MELTING FURNACE AND METHOD FOR MELTING NONFERROUS METAL

CROSS REFERENCE TO RELATED APPLICATION

This is a continuation Application of International Application No. PCT/JP2014/076411, filed on Oct. 2, 2014, which claimed the priority of Japanese Application No. 2013-208782 filed Oct. 4, 2013, the entire content of which is incorporated herein by reference.

TECHNICAL FIELD

The present invention relates to a nonferrous metal melting furnace for melting nonferrous metal, such as aluminum alloy, for the purpose of manufacturing various types of cast products, and to a method for melting nonferrous metal.

BACKGROUND OF THE INVENTION

FIG. 6 illustrates a conventionally known nonferrous metal melting furnace for melting nonferrous metal, e.g., an aluminum alloy, for the purpose of manufacturing various types of cast products (see, for example, the Japanese Patent Publication No. 2554510). The nonferrous metal melting furnace has a configuration such that molten metal 10 is re-circulated between a heating chamber 22 and a vortex chamber 23 by a re-circulation metal pump 21, while the molten metal 10 is heated by flame 50 ejected from a burner 25 provided in the heating chamber 22, and while nonferrous metal is fed in the vortex chamber 23 through a feeding port of a feeding shoot 27. In place of the burner 25, an electric heater can be used to heat the molten metal 10.

However, when the conventional nonferrous metal melting furnace is used to melt in molten metal an undried nonferrous metal block such as an aluminum briquette made of compressed aluminum chips, the briquette can involve a steam explosion, if the briquette is completely submerged into the molten aluminum metal. It is because the briquette contains oil and moisture coming from coolant.

In order to avoid the problem mentioned above, a melting furnace may be used to directly heat and melt such briquetted chip by flame of a burner of the furnace. However, this method causes the briquetted chip to spring back to chip during a melting process, by which the sprung back chip with a thin section relative to its large surface area is directly heated and melted, resulting in an increase in oxide and a significant decrease in metal recovery rate.

In addition, FIG. 7 illustrates another method in which a relatively large drying apparatus 29 such as a rotary kiln dryer is used to pre-dry aluminum chips as they are before briquetting that are fed from a storage hopper. However, it is extremely difficult to form a briquette from these pre-dried aluminum chips, because coolant to be used as a lubricant in forming a compressed chips is also dried.

Even if a briquette can be successfully formed by such a relatively large drying apparatus 29, this adversely requires a substantially large amount of costs in installation and maintenance of the apparatus 29.

It is therefore an object of the present invention to provide a nonferrous metal melting furnace and a melting method for safely and effectively melting such an undried nonferrous metal block even if it contains oil and moisture coming from coolant.

DISCLOSURE OF THE INVENTION

A nonferrous metal melting furnace according to a first aspect of the invention, which aims to achieve the above-mentioned object, includes:

a heating chamber (32) for heating molten metal (10) to increase and hold the temperature of the molten metal (10);

a vortex chamber (33) communicated with the heating chamber (32), the vortex chamber (33) being arranged to submerge and melt in a vortex of the molten metal (10) a nonferrous metal being fed; and a re-circulation metal pump (31), the re-circulation metal pump (31) being used to feed the molten metal (10) in the heating chamber (32) to the vortex chamber (33) and feed the molten metal (10) discharged from the vortex chamber (33) back to the heating chamber (32), the vortex chamber (33) including:

an outer circumference wall (331) configured so as to provide a flow passage (34) through which the molten metal (10) is fed from a side of the heating chamber (32), the outer circumference wall (331) having internally a space (330);

a container (332) disposed at an internal center of the outer circumference wall (331), and having an opening at an upper side thereof and a tapered wall of an upside down conical shape at a lower side thereof;

a shoal portion (333) annularly provided between the container (332) and the outer circumference wall (331) so as to encircle the outer circumference of the container (332); and a dam portion (334) partitioning the container (332) from the shoal portion (333) and protruding upward from the upper surface of the container (332) so that the upper surface of the dam portion (334) comes higher than the bottom of the shoal portion (333), wherein the flow passage (34) is directly communicated with the shoal portion (333) at a position horizontally offset from the central axis (90) extending vertically of the container (332), so that the molten metal (10) re-circulates in the shoal portion (333) while part of the molten metal (10) flows over the dam portion (334) and enters into the container (332) where the molten metal (10) forms a vortex.

A nonferrous metal melting furnace according to a second aspect of the invention includes the flow passage (34) that is communicated with the shoal portion (333) in a tangential direction of the shoal portion (333).

A method for melting nonferrous metal according to a third aspect of the invention employs the nonferrous metal melting furnace (30) of the first or second aspect of the invention, wherein the nonferrous metal includes an undried nonferrous metal block, the undried nonferrous metal block having such a size that is not completely submerged into the molten metal (10) in the shoal portion (333) where the molten metal (10) is re-circulating.

A method for melting nonferrous metal according to a fourth aspect of the invention employs the nonferrous metal block that is an aluminum briquette (60) made of compressed aluminum chips, and employs the molten metal (10) that is aluminum molten metal.

A method for melting nonferrous metal according to a fifth aspect of the invention employs the re-circulation metal pump (31) that is controlled so that the distance (80) between the bottom of the shoal portion (333) and the upper surface of the molten metal (10) is shorter than the height (70) of the briquette (60).

Symbols in parentheses show constituents or items corresponding to the drawings.

The nonferrous metal melting furnace of the present invention includes the vortex chamber provided with the container that has the opening at an upper side thereof and the taper wall of generally upside-down conical shape at a lower side thereof. The furnace further includes the shoal portion and the dam portion. The shoal portion is disposed so as to encircle the outer circumference of the container over the dam portion. The furnace is configured such that the molten metal re-circulates in the shoal portion while part of the molten metal flows over the dam portion and enters into the container where the molten metal forms a vortex. Accordingly, when nonferrous metal such as an aluminum alloy is fed into the shoal portion or the flow passage, for example, the fed nonferrous metal moves along the shoal portion, flows over the dam portion, and is submerged into the container to be melted finally.

Thus, an undried nonferrous metal block, such as a briquette made of compressed aluminum chips, of a size that is not completely submerged into the molten metal in the shoal portion and partially exposed out of the molten metal gradually starts to dry and melt by the molten metal re-circulating in the shoal portion, and the volume of the undried nonferrous metal block gradually becomes reduced in size. In this stage, the undried nonferrous metal block allows emissions of steam from the part thereof exposed out of the molten metal, thereby preventing the possibility of a steam explosion of the undried nonferrous metal block. Thus, the undried nonferrous metal block starts to spring back and turn into smaller pieces or particles, which flow over the dam portion together with the molten metal and are submerged into the container and then melt completely.

Therefore, no drying process for the undried nonferrous metal block before it is fed is necessary, thereby excluding an additional cost and manpower, and avoiding a decrease in the recovery rate of the molten metal. Not only nonferrous metal blocks but also loose chips may be fed as they are into the shoal portion or the flow passage to be sent into the container. Furthermore, chips can be fed directly into the container from above of the container.

According to the nonferrous metal melting furnace of the present invention, the flow passage feeding the molten metal to the shoal portion is communicated with the shoal portion in a tangential direction of the shoal portion, which configuration allows the molten metal in the shoal portion to re-circulate with a high flow velocity. This makes it possible to efficiently melt and re-circulate the nonferrous metal in the shoal portion.

The method for melting nonferrous metal according to the present invention uses the nonferrous metal melting furnace in which the container of a generally upside-down conical shape is encircled by the shoal portion, in which molten metal re-circulates, via the dam portion. The method is such that: an undried nonferrous metal block such an aluminum briquette made of compressed aluminum chips, for example, is directly fed into the shoal portion or the flow passage through which the molten metal is re-circulated, the undried nonferrous metal block having such a size that is not completely submerged into the molten metal in the shoal portion; the fed undried nonferrous metal block is dried as oil and moisture coming from coolant contained in the block is evaporated and gotten burned by the heat of the molten metal while it is gradually melted to have reduced volume consisting of small pieces and particles of nonferrous metal; and the small pieces and particles move together with the molten metal in the shoal portion, flown over the dam portion, and are submerged into the vortex in the container to be melted. Accordingly, the method is able to avoid a steam explosion in a process where fed undried nonferrous metal blocks are completely melted.

The method according to the invention does not require a large scale of apparatus, while merely requiring an annular shoal portion in the outer circumference of the container, to achieve continuous melting of undried nonferrous metal blocks with improved safety and efficiency.

It should be noted that none of the prior documents mentioned above describes the feature of the present invention wherein the container has an opening at an upper portion thereof and a tapered wall of generally upside-down conical shape at a lower portion thereof, and the container is encircled at the outer circumference thereof by the annular shoal portion over the dam portion.

DETAILED DESCRIPTION

Figure 1:
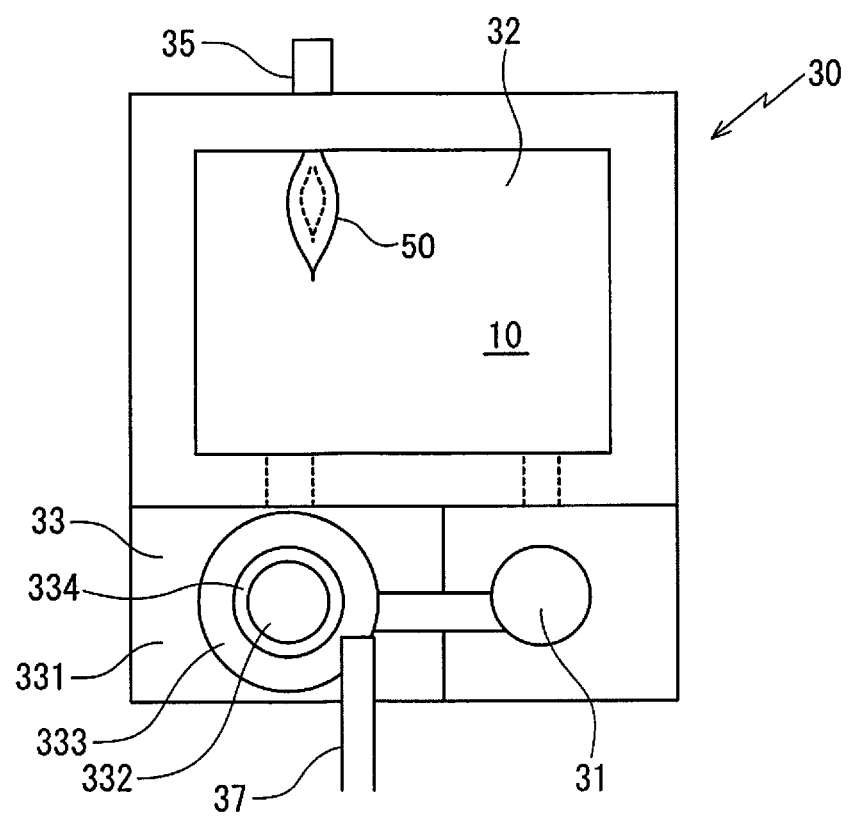
FIG. 1 is a schematic plane view illustrating a nonferrous metal melting furnace according to an embodiment of the present invention.
Figure 2:
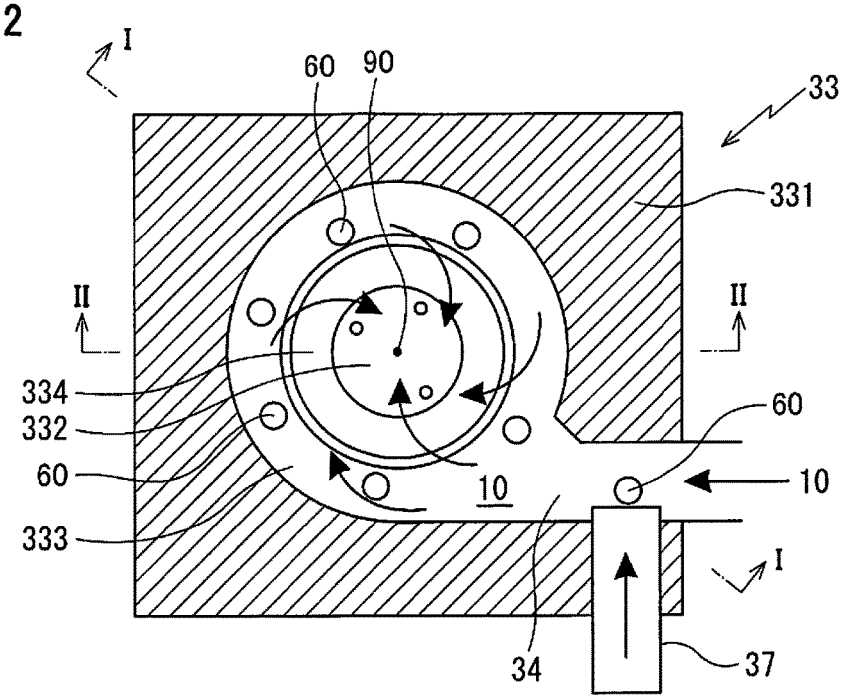
FIG. 2 is a cross sectional view of a vortex chamber illustrated in FIG. 1.

With reference to FIGS. 1 to 4, a nonferrous metal melting furnace 30 according to an embodiment of the present invention will be described.

The nonferrous metal melting furnace 30 is able to submerge and melt in molten metal a nonferrous metal block such as an aluminum briquette 60 that is composed of compressed aluminum chips, retained undried and directly fed into the furnace. The nonferrous metal melting furnace 30 includes a heating chamber 32 and a vortex chamber 33. The heating chamber 32 heats molten metal 10, which is re-circulated by means of a re-circulation metal pump 31, to increase and maintain the temperature of the molten metal 10. The vortex chamber 33 is communicated with the heating chamber 32 and submerges and melts in a vortex of the molten metal a briquette 60 that has been fed.

The heating chamber 32 is provided with a burner 35 that fires fossil fuel such as oil or gas. The burner 35 ejects flame 50 to heat aluminum molten metal 10.

In place of the burner 35, an electric heater may be immersed into the aluminum molten metal 10 to directly heat the molten metal 10.

The molten metal level in the heating chamber is moved upward in the vortex chamber 33 by the re-circulation metal pump 31 and the molten metal is then fed into the container 332 through the flow passage 34. The vortex chamber 33 receives and melts a briquette 60 that is fed through a feeding shoot 37. The vortex chamber 33 discharges the molten metal 10 that returns to the heating chamber 32, whereby the molten metal 10 re-circulates in the nonferrous metal melting furnace 30.

The vortex chamber 33 includes an outer circumference wall 331 forming a surrounding of the vortex chamber 33, a container 332 formed inside the outer circumference wall 331, a shoal portion 333 encircling an outer circumference of the container 332, and a dam portion 334 protruding upward from an upper surface of the outer circumference of the container 332.

The outer circumference wall 331 has a cylindrical shape forming inside thereof a hollow columnar space 330, and is arranged so as not to interfere with a flow passage 34, and thus retains the flow passage 34 through which the molten metal 10 is fed inwardly from a side of the heating chamber 32. In this embodiment, the flow passage 34 is provided by a hole formed in the outer circumference wall 331; however, the flow passage 34 may be configured of any other forms as far as it functions. The outer circumstance wall 331 has a generally rectangular outer cross section, however, it may have another shape of cross section. In addition, the outer circumference wall 331 may preferably have a circular inner cross section as shown in this embodiment, though any shapes can be allowed as far as the inner cross section can accommodate the container 332 and the shoal portion 333. The space 330 may be provided with a generally hollowed columnar shape such as a hexagonal columnar shape or an octagonal columnar shape, thereby forming a generally circular inner cross section.

The container 332 has a generally upside-down conical mortar shape having upper side thereof an opening and lower side thereof a tapered wall. The container 332 is disposed at an inner central portion of the outer circumference wall 331. The container employed in this embodiment has a depth of 300 mm. The molten metal 10 is forced to flow in an obliquely downward direction in the container so that the molten metal 10 forms a vortex. It should be noted that the container may be provided inner surface thereof with an inclined groove to enhance generation of the vortex of the molten metal.

The shoal portion 333 is partitioned from the container 332 by the dam portion 334 of an annular shape provided between the container 332 and the outer circumference wall 331, the dam portion 334 encircling the outer circumference of the container 332 and protruding upward from an upper surface of the outer circumference of the container 332. The dam portion 334 has a belt-like shape and has a height shorter than that of the outer circumference wall 331. The dam portion 334 has an upper surface that is higher than the bottom of the shoal portion 333. The depth of the shoal portion 333, which is the distance 40 between the bottom of the shoal portion 333 and the upper surface of the dam portion 334, is set to 30 mm. The dam portion 334 may be arbitrarily designed in response to the height 70 of a briquette 60. The briquette 60 is directly fed to the shoal portion 333 through the feeding shoot 37 that has a feeding port facing the shoal portion 333.

The flow passage 34 is led from a side of the heating chamber 32 to an inner side of the outer circumference wall 331 and is directly communicated with the shoal portion 333. The flow passage 34 is directed to a position horizontally offset from the vertically extending central axis 90 of the container 332. In particular, the flow passage 34 is communicated with the shoal portion 333 of an annular shape in a tangential direction of the shoal portion 333.

With such a configuration, the molten metal 10 fed from a side of the heating chamber 32 through the flow passage 34 by means of the re-circulation metal pump 31 re-circulates in the shoal portion 333, while part of the molten metal 10 flows over the dam portion 334 and enters into the container 332, thereby causing the molten metal 10 to form a vortex in the container 332. The vortex of the molten metal 10 in the container 332 has a depth of about 120 to 200 mm.

In this state, certain amount of molten metal 10 is fed to the shoal portion 333 through the flow passage 34 so that part of the molten metal 10 circulating in the shoal portion 333 flows over the dam portion 334. The distance 80 between the upper surface of the molten metal 10 in the shoal portion 333 and the bottom of the shoal portion 333 is set to 50 mm in this embodiment that is shorter than the height 70 (normally 80 mm) of a briquette 60 to be fed. The distance 80 can be modified in response to the height 70 of a briquette 60 actually fed.

Figure 3:
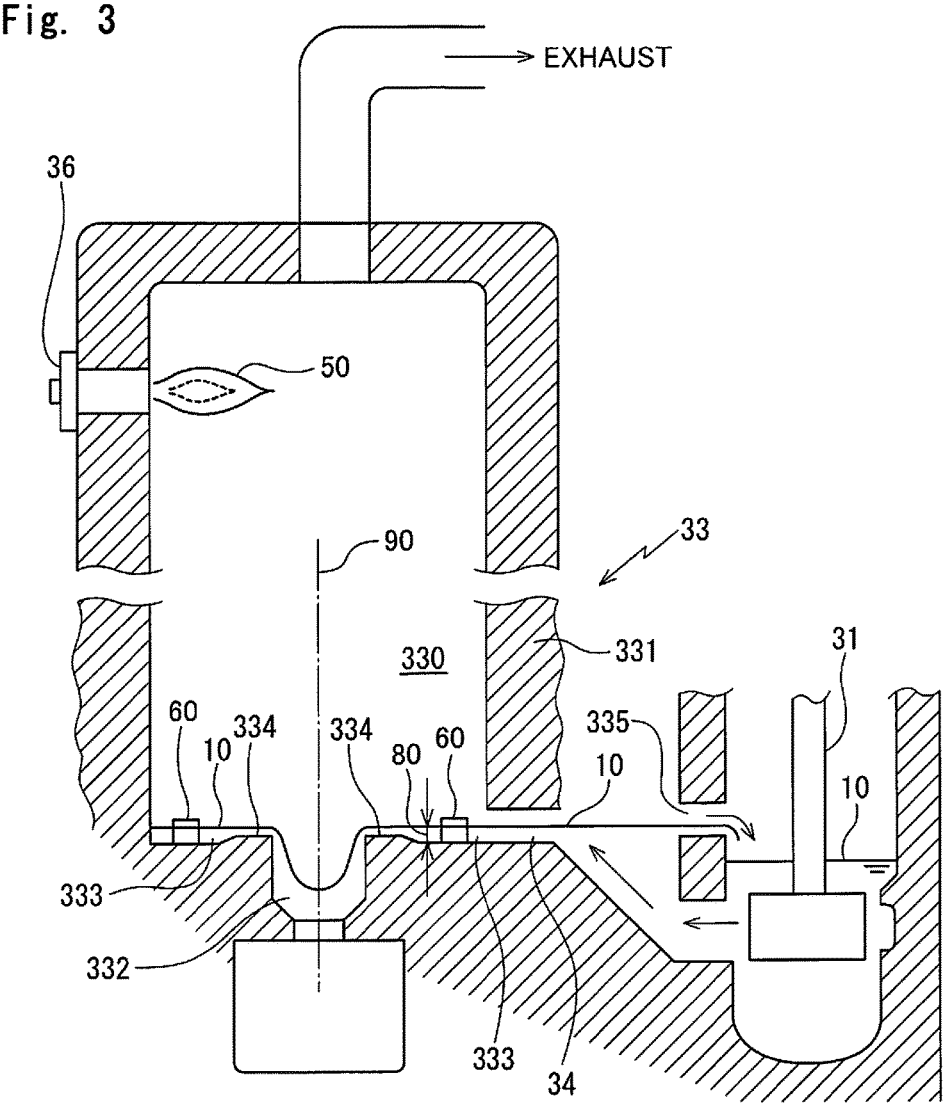
FIG. 3 is a sectional view along the line I-I in FIG. 2.
Figure 4:
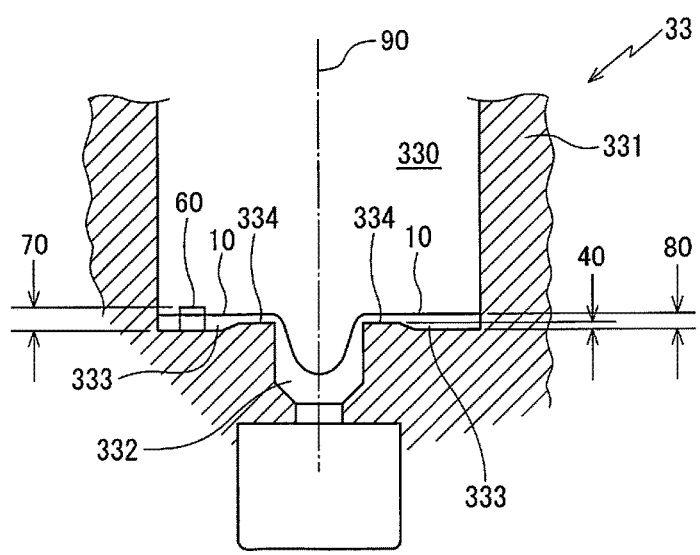
FIG. 4 is a sectional view along the line II-II in FIG. 2.

Power inputted to the re-circulation metal pump 31 is varied and adjusted by a controlling unit in response to the amount of molten metal 10 held in the heating chamber 32, whereby the distance 80 between the upper surface of the molten metal 10 in the shoal portion 333 and the bottom of the shoal portion 333 is provided with a constant dimension, and is controlled to have a dimension smaller than the height 70 of the briquette 60. In addition, as illustrated in FIG. 3, a return port 335 is provided in the furnace to return molten metal 10 to a side of the re-circulation metal pump 31 so that the distance 80 can have a constant dimension.

The nonferrous metal melting furnace 30 having a configuration described above is used to melt briquettes 60 in such a manner that each of the briquettes 60, which is undried, is directly fed through the feeding shoot 37 to the shoal portion 333 where molten metal 10 is re-circulating. Each of the fed undried briquettes 60 has dimensions such that it does not completely submerged into the molten metal 10 in the shoal portion 333.

The briquettes 60 fed into the shoal portion 333 each has a portion exposed out of the molten metal 10 and a portion submerged into the molten metal 10 being re-circulating in the shoal portion 333. The portion submerged into the molten metal 10 is melted by sensitive heat of the molten metal 10, whereby the volume of the briquette 60 is gradually reduced. In this state, the molten metal 10 allows emissions of steam and fume (containing oil coming from coolant) from the portion thereof exposed out of the molten metal 10, thereby preventing the possibility of a steam explosion. The emitted steam and fume (containing oil coming from coolant) are burned by a burner 36 (which is independent from the burner 35 provided to the heating chamber 32, and is located at an upper portion of the space 330 and installed on the outer circumference wall 331) and turns into an innocuous substance. The innocuous substance is exhausted to the atmosphere through an upper portion of the space 330.

The briquette 60, then, turns into smaller pieces and particles, which circulate with the molten metal 10 in the shoal portion 333, flow over the dam portion 334, drop into the container 332, and are submerged into and melted by the vortex of the molten metal 10 in the container 332.

It should be noted that in this embodiment, briquette 60 to be fed into molten metal is subjected to a process of completely drying oil and moisture coming from coolant adhered to the briquette 60. It is because if aluminum molten metal undesirably contains residual carbon included in the coolant, the carbon cannot be removed by a flux treatment or a bubbling treatment using an inert gas, whereby the quality of the recovered molten metal is deteriorated. Additionally, even if carbon or dioxin is formed in the fume generating from the coolant, the carbon or dioxin can be thermally decomposed by controlling the burner 36 installed on the outer circumference wall 331 to provide a temperature of 750° C. or more.

Such arrangements can eliminate the need of a separated drying process of the briquette 60 prior to feeding of the briquette 60, thereby excluding an additional cost and preventing a decrease in the metal recovery rate.

Figure 5:
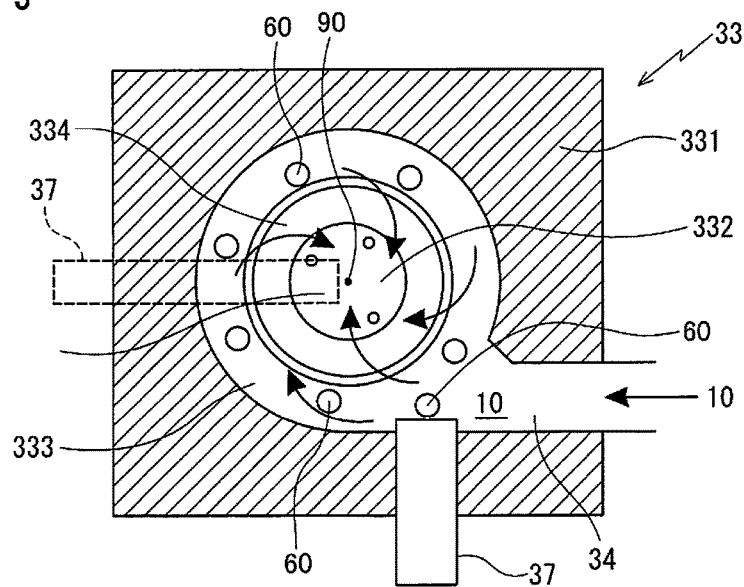
FIG. 5 is a cross sectional view of the vortex chamber illustrated in FIG. 1, the vortex chamber having a different feeding shoot arrangement.
Figure 6:
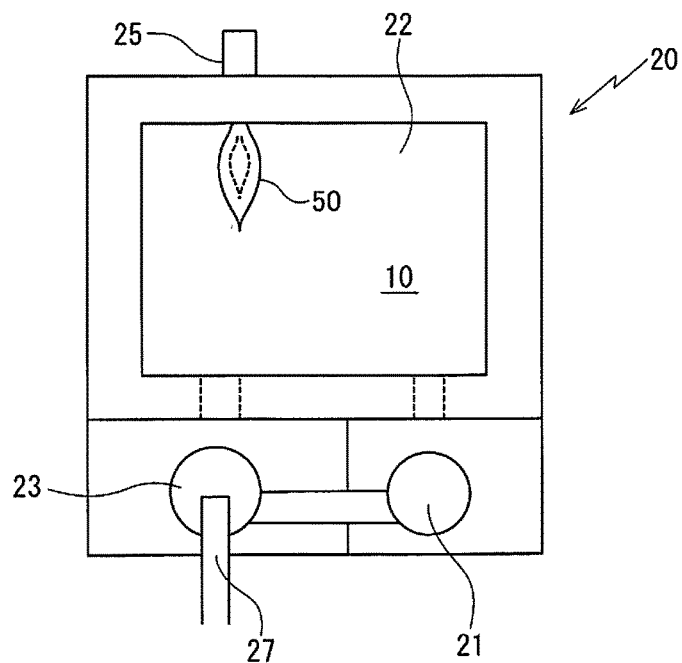
FIG. 6 is a schematic plane view of a nonferrous metal melting furnace according to a prior art.
Figure 7:
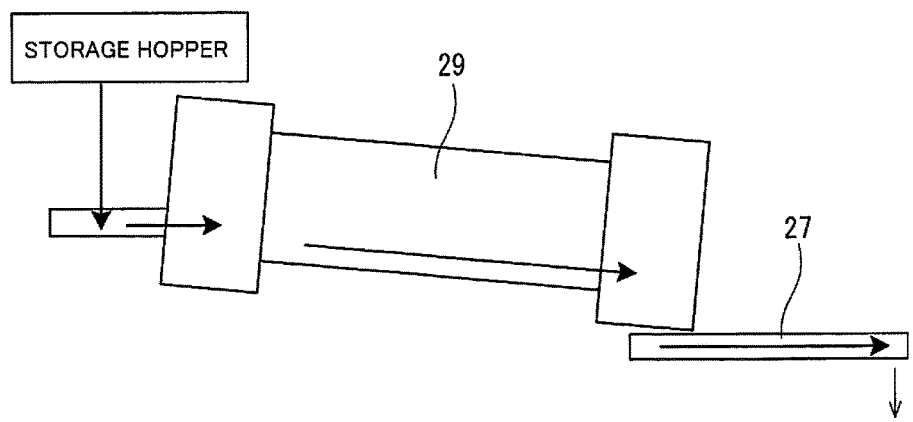
FIG. 7 is a side view illustrating a reprocessing of a nonferrous metal before it is fed, according to a prior art.

As illustrated in FIG. 5, the feeding shoot 37 may be disposed so that the feeding port thereof comes further closer to a side of the shoal portion 333.

Furthermore, in this embodiment aluminum briquette 60 made of compressed aluminum chips is to be fed into the melting furnace 30, however, other types of nonferrous metal blocks can be fed as far as the blocks each has such a size that part of the block is exposed out of the molten metal 10.

Moreover, a material to be employed is not limited to the nonferrous metal blocks or briquettes described above, and loose chips may be fed to the shoal portion 333 where the fed chips circulate and are sent to the container 332.

In addition, although in this embodiment the briquette 60 is fed directly into the shoal portion 333, the briquette 60 may be fed directly into the flow passage 34 through which the molten metal is fed.

As illustrated by dotted line in FIG. 5, the feeding shoot 37 may be disposed so that the feeding port thereof comes above the container 332, whereby chips can be fed directly into the container 332 from above.

Moreover, the nonferrous metal melting furnace 30 described in this embodiment is provided at least with the heating chamber 32 and the vortex chamber 33; however, the furnace 30 may be additionally provided with a molten metal tapping out chamber, a dross removing chamber and a killing chamber.

We claim:

1. A nonferrous metal melting furnace, the furnace comprising:
    a heating chamber;
    a recirculation metal pump configured to feed molten metal into the heating chamber and to recirculate molten metal discharged from the heating chamber;
    a vortex chamber including:
        an outer circumference wall defining an internal space about a central axis and defining a flow passage configured to receive a molten metal, the internal space in communication with the heating chamber;
        a container having an outer wall about the central axis defining an opening at an upper side of the container in communication with the internal space;
        a shoal portion defined about the opening of the container between the outer wall of the container and the outer circumference wall, the shoal portion in direct communication with the flow passage; and
        a dam portion extending upward from a bottom surface of the shoal portion about the opening to partition the opening of the container from the shoal portion.

2. The nonferrous metal melting furnace according to claim 1, further comprising a feeding shoot configured to feed briquettes of nonferrous metal into the vortex chamber.

3. The nonferrous metal melting furnace according to claim 2, wherein the feeding shoot is configured to feed the briquettes directly into the shoal portion.

4. The nonferrous metal melting furnace according to claim 1, further comprising a controller configured to control the recirculation metal pump such that a distance between the bottom surface of the shoal portion and a top surface the dam portion is shorter than a height of the molten metal above the bottom surface of the shoal portion.

5. The nonferrous metal melting furnace according to claim 4, wherein the controller is configured to control the recirculation metal pump such that the height of the molten metal in the shoal portion is less than a dimension of briquettes being fed to the vortex chamber.

6. The nonferrous metal melting furnace according to claim 1, further comprising a return port configured to return molten metal from the shoal portion to the recirculation metal pump.

7. A nonferrous metal melting furnace comprising:
    a heating chamber configured to heat molten metal to increase and hold a temperature of the molten metal;
    a vortex chamber in communication with the heating chamber, the vortex chamber being arranged to submerge and melt in a vortex of the molten metal a nonferrous metal being fed; and
    a re-circulation metal pump configured to feed the molten metal in the heating chamber to the vortex chamber and feed the molten metal discharged from the vortex chamber back to the heating chamber,
    the vortex chamber comprising:
        an outer circumference wall configured so as to provide a flow passage through which the molten metal is fed from a side of the heating chamber, the outer circumference wall having internally a space;
        a container disposed at an internal center of the outer circumference wall, and having an opening at an upper side thereof and a tapered wall of an upside down conical shape at a lower side thereof;
        a shoal portion annularly provided between the container and the outer circumference wall so as to encircle an outer circumference of the container; and
        a dam portion partitioning the container from the shoal portion and protruding upward from an upper surface of the container so that an upper surface of the dam portion comes higher than a bottom of the shoal portion,
    wherein the flow passage is in direct communication with the shoal portion at a position horizontally offset from a central axis of the container extending vertically, so that the molten metal re-circulates in the shoal portion while part of the molten metal flows over the dam portion and enters into the container where the molten metal forms a vortex.

8. The nonferrous metal melting furnace according to claim 7, wherein the flow passage is in communication with the shoal portion in a tangential direction of the shoal portion.

9. The nonferrous metal melting furnace according to claim 7, wherein the re-circulation metal pump is controlled so that a distance between the bottom of the shoal portion and the dam portion is shorter than a height of the nonferrous metal to be fed and a distance between an upper surface of the molten metal in the shoal portion and the bottom of the shoal portion is shorter than the height of the nonferrous metal to be fed.

* * * * *